(12) United States Patent
Tomatsuri et al.

(10) Patent No.: US 6,715,453 B2
(45) Date of Patent: Apr. 6, 2004

(54) METHOD AND APPARATUS FOR PREVENTING LOCKING OF ENGINE-OPERATING-CHARACTERISTIC CHANGING DEVICE

(75) Inventors: Mamoru Tomatsuri, Toyota (JP); Toshifumi Takaoka, Susono (JP); Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 35 days.

(21) Appl. No.: 10/173,815

(22) Filed: Jun. 19, 2002

(65) Prior Publication Data

US 2003/0000485 A1 Jan. 2, 2003

(30) Foreign Application Priority Data

Jun. 28, 2001 (JP) ........................................ 2001-196920

(51) Int. Cl.$^7$ .................................................. F01P 9/00
(52) U.S. Cl. ................ 123/41 E; 123/78 F; 123/90.17; 123/78 E; 123/198 D
(58) Field of Search ........................... 123/41 E, 198 D, 123/78 E, 78 F, 90.15, 90.16, 90.17, 90.31, 179.18, 48 R, 48 B, 78 B, 78 BA

(56) References Cited

U.S. PATENT DOCUMENTS

| | | | |
|---|---|---|---|
| 5,924,395 A | | 7/1999 | Moriya et al. |
| 6,397,803 B1 | | 6/2002 | Fujiwara et al. |
| 6,443,112 B1 | * | 9/2002 | Kinugawa ................ 123/90.17 |
| 6,477,999 B1 | * | 11/2002 | Markley .................. 123/90.17 |
| 6,478,000 B2 | * | 11/2002 | Ishii et al. ............... 123/90.17 |
| 6,499,450 B2 | * | 12/2002 | Takahashi et al. ....... 123/90.15 |
| 6,634,329 B2 | * | 10/2003 | Kusano et al. ........... 123/90.17 |

FOREIGN PATENT DOCUMENTS

JP A 2000-320356 11/2000

* cited by examiner

*Primary Examiner*—Tony M. Argenbright
*Assistant Examiner*—Hyder Ali
(74) *Attorney, Agent, or Firm*—Oliff & Berridge, PLC

(57) ABSTRACT

A method of controlling an engine-operating-characteristic changing device operable between a first and a second operating state and including a locking device for locking the changing device in the first operating state in which a compression ratio of an intake air of an internal combustion engine is maintained at a value higher than that in the second operating state, the method including steps of determining whether there is a possibility that the engine-operating-characteristic changing device is locked in the first operating state by the locking device, where the changing device should not be placed in the first operating state, and if it is determined that there is the possibility, implementing a preventive operation to prevent the locking unit from locking the changing device in the first operating state.

14 Claims, 8 Drawing Sheets

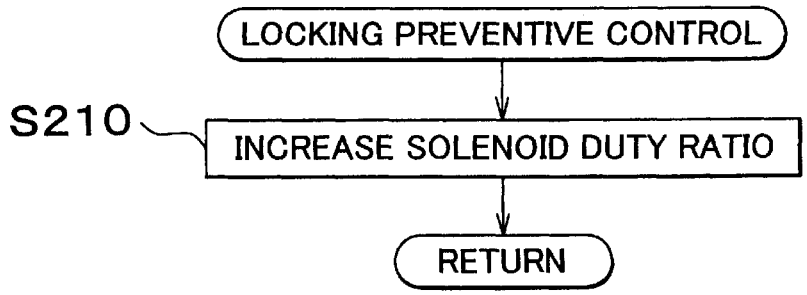
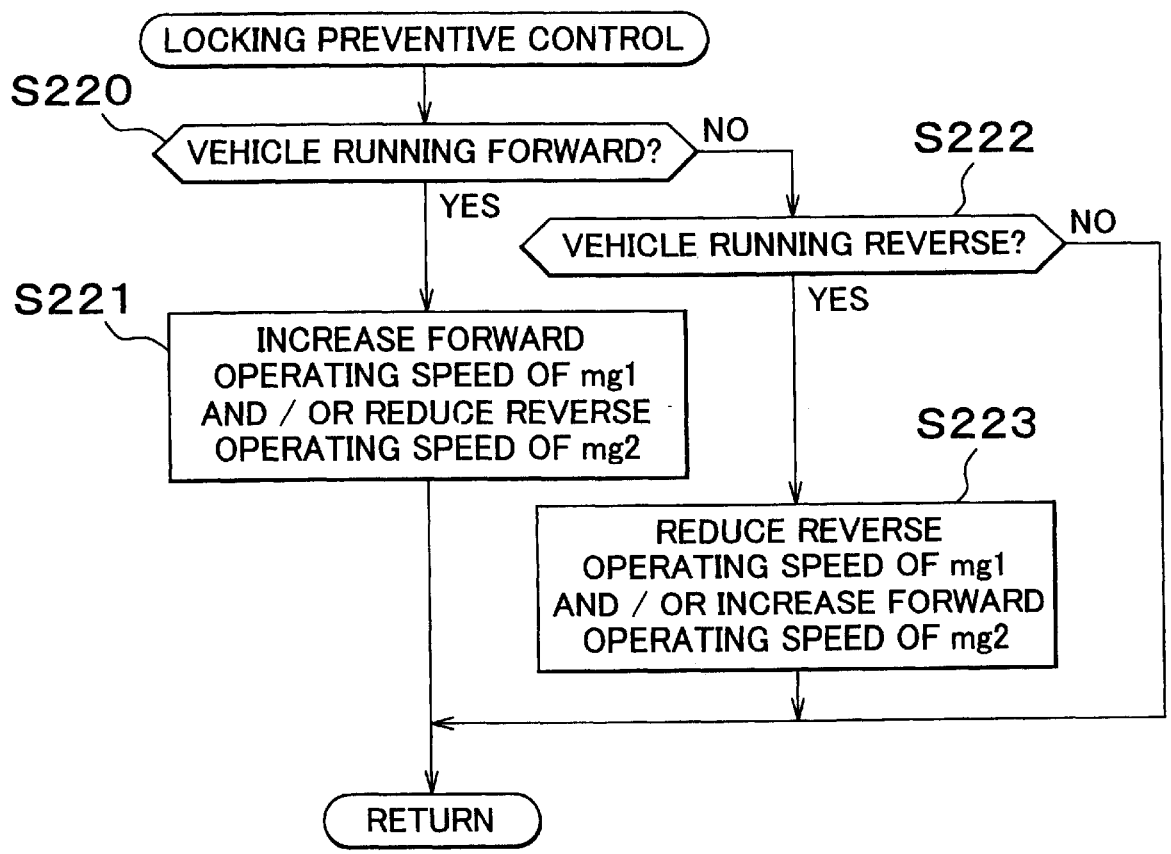

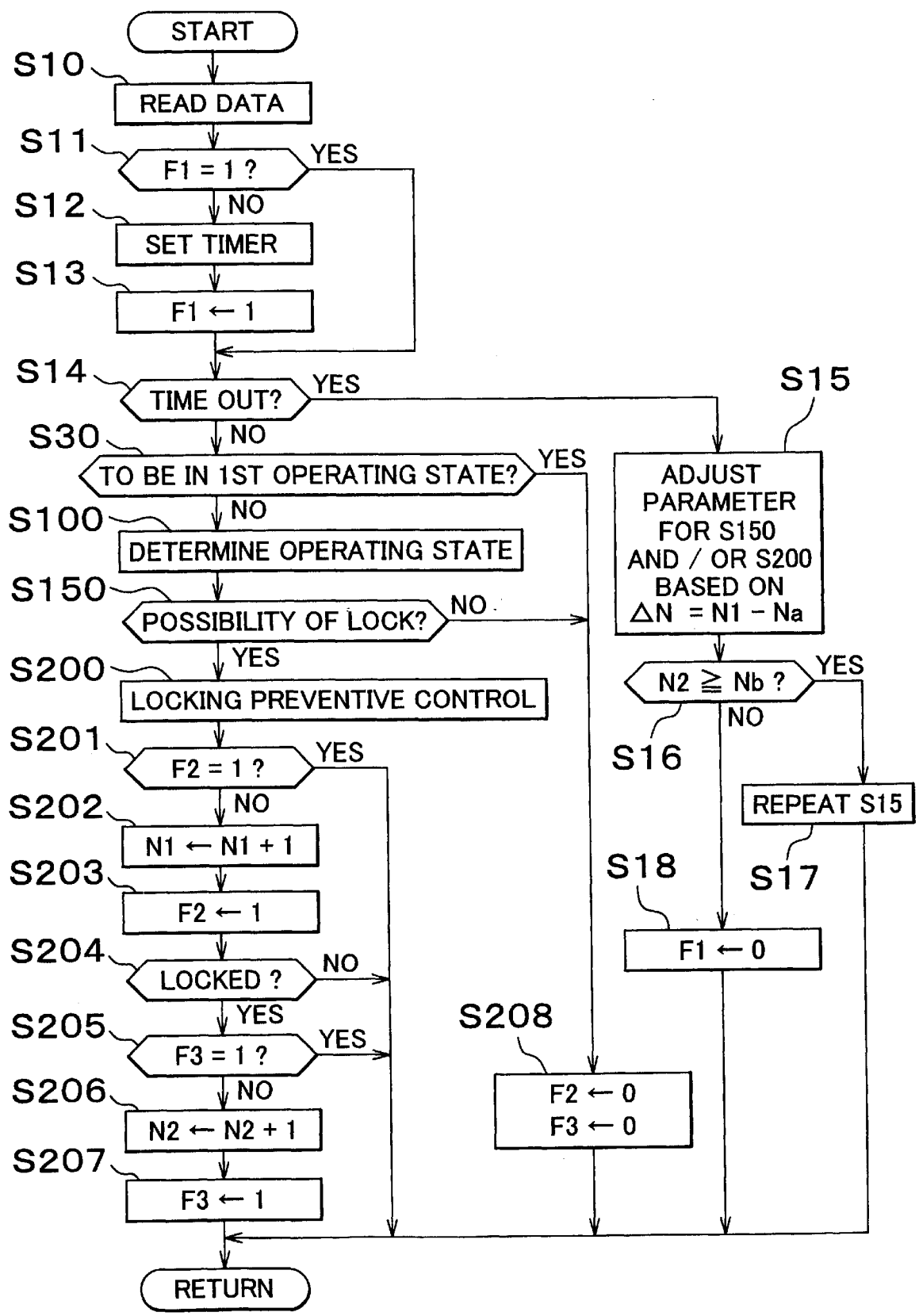

METHOD AND APPARATUS FOR PREVENTING LOCKING OF ENGINE-OPERATING-CHARACTERISTIC CHANGING DEVICE

INCORPORATION BY REFERENCE

The disclosure of Japanese Patent Application No. 2001-196920 filed on Jun. 28, 2001, including the specification, drawings and abstract, is incorporated herein by reference in its entirety.

BACKGROUND OF THE INVENTION

1. Field of Invention

This invention relates to techniques for changing the operating characteristics of an internal combustion engine. More particularly, this invention relates to a method and apparatus for preventing an engine-operating-characteristic changing device from being locked in a first operating state by locking unit, during an operation of the engine-operating-characteristic changing device which is operable between the first operating state and a second operating state, to change a compression ratio of an intake air of an internal combustion engine, for controlling the operating characteristic of the engine.

2. Description of Related Art

In the field of an internal combustion engine of an automobile, it is known to control the engine such that the engine is operated at a comparatively low compression ratio of an intake air so as to reduce the vibration and improve the fuel economy of the engine, during normal operation of the engine after a warm-up operation, while the engine is operated in a cold state at a comparatively high compression ratio of the intake air, so as to facilitate the starting of the engine, before the warm-up operation, particularly upon cranking of the engine in a cold state. The compression ratio of the intake air may be controlled depending upon a change in the load acting on the engine, even after the warm-up operation of the engine, in order to improve the fuel economy of the engine. In the case of an internal combustion engine of piston type, the compression ratio of the intake air can be changed in various methods by a valve timing regulating device, which is arranged, for instance: (a) to retard or advance the closing timing of each intake valve; (b) to temporarily open each exhaust valve at a suitably selected timing during a period of transition from the intake stroke to the compression stroke; (c) to suitably control the lift amounts of intake- and exhaust-valve drive cams in the form of three-dimensional cams; or (d) to provide an adjustable eccentric bearing at a point of connection between a piston rod and a crankshaft, or between the piston rod and a piston.

An example of an intake-valve timing control device arranged to retard or advance the closing timing of the intake valve for changing the compression ratio of the intake air is disclosed in U.S. Pat. No. 5,924,395 owned by the assignee of the present application. The intake-valve timing control device disclosed therein is arranged to change the opening and closing timings of the intake valve within respective predetermined ranges of the angular position or phase of the crankshaft, as indicated in FIG. 1, in particular, to retard or advance the closing timing relative to the reciprocating movement of the piston, so that the quantity of the intake air introduced in the corresponding cylinder at the moment of closure of the intake valve is increased or reduced to control the compression ratio of the intake valve. In a four-cycle engine, the closing timing of the intake valve generally corresponds to about 70° after the bottom dead center (abbreviated as "ABDC") of the reciprocating movement of the piston. The intake-valve timing control device is arranged to increase this ABDC angle to about 110–120°, for retarding the closing timing, so that the quantity of the intake air existing in the cylinder upon closing of the intake valve is accordingly reduced. As a result, the compression ratio of the intake air is reduced. As shown in FIG. 2 by way of example, the pressure within the cylinder at the end of the compression stroke considerably varies with a change in the closing timing of the intake valve by the intake-valve timing control device described above.

In the internal combustion engine wherein the compression ratio of the intake air is variable as described above, the compression ratio of the intake air is controlled to be comparatively low in a hot state of the engine after a warm-up operation, to permit a relatively higher cranking speed for starting the engine with reduced amounts of vibration and noise. When the engine is started in a cold state, the compression ratio of the intake air is controlled to be comparatively high, to assure a high degree of starting stability of the engine. In this respect, the internal combustion engine capable of changing the compression ratio of the intake air is suitable for automotive vehicles recently developed to meet increasing requirements for saving of fuel resources and environmental protection, such as economy-running system vehicles adapted to temporarily turn off the engine when the vehicle is stopped at a traffic signal, for instance, and hybrid vehicles which are driven by a suitably selected one of an internal combustion engine and an electric motor.

Referring to FIGS. 3–5, there is shown the intake-valve timing control device disclosed in the above-identified U.S. Patent, which is partly modified to meet the object of the present invention, and for adaptation to a hybrid vehicle. FIGS. 4 and 5 are views taken along line A—A of FIG. 3, which show the intake-valve timing control device in two different operating states. In FIG. 3, reference sign "e" denotes an internal combustion engine having a crankshaft c, which is operatively connected through a torque distributing device p of planetary gear type to a first motor/generator mg1 and a second motor/generator mg2, each of which is capable of functioning selectively as an electric motor and an electric generator. The internal combustion engine e, the first motor/generator mg1 and the second motor/generator mg2 cooperate to constitute a regenerative hybrid drive system which is operatively connected at a drive shaft of the motor/generator mg1 to a pair of wheels w, through respective axles s, a differential gear d and a transmission t. The first motor/generator mg1 and the second motor/generator mg2 are electrically connected to a battery b through an inverter i, and are selectively operated as an electric motor or an electric generator, depending upon the specific operating or running state of the vehicle.

The above-indicated intake-valve timing control device, which is generally indicated at 10 in FIGS. 3–5, may be considered to function as an intake-air compression-ratio control unit for controlling the compression ratio of the intake air, as described below. This intake-valve timing control device 10 is constructed to operate as a rotary actuator operable between a gear 14 and an intake-valve camshaft 18. The gear 14 is driven by the crankshaft c of the internal combustion engine e through an endless belt 12, in synchronization with the crankshaft c. The intake-valve camshaft 18 holds an intake-valve operating cam 16.

Described more specifically, an internally splined annular member 22 having four radial partition walls 26, and an annular end plate 24 are fixedly assembled with the gear 14 through four bolts 20, so as to define a working chamber. In this working chamber, there is accommodated a rotor 30 fixed to one end of the camshaft 18 by a bolt 28. The rotor 30 includes a central hub portion, and four vanes 32 formed around the hub portion. A sectorial chamber 34 is formed between the adjacent two partition walls 26 located on the respective circumferentially opposite sides of each vane 32, so that the vane 32 is movable in the corresponding sectorial chamber 34, relative to a housing which is constituted by the gear 14, annular member 22 and end plate 24.

The housing is rotated in the clockwise direction indicated by arrows in FIGS. 4 and 5 when the gear 14 is rotated through the endless belt 12 by forward rotation of the crankshaft c. In the state of the intake-valve timing control device 10 as shown in FIG. 4, the camshaft 18 is in a fully retarded angular position relative to the crankshaft c, in which the closing timing of the intake valve is fully retarded. In the state of FIG. 5, on the other hand, the camshaft 18 is placed in a fully advanced angular position relative to the crankshaft c, in which the closing timing is fully advanced.

One of the vanes 32 has a stepped cylindrical hole 36 having a large-diameter portion and a small-diameter portion. A lock pin 40 in the form of a stepped piston having a large-diameter head portion 38 and a small-diameter portion 42 is fitted in the stepped cylindrical hole 36 such that the large-diameter head portion 38 and the small-diameter portion 42 engage the respective large-diameter and small-diameter portions of the stepped cylindrical hole 36, and such that a movement of the lock pin 40 in the hole 36 is guided by sliding contact of the small-diameter portion 42 of the lock pin 40 with the small-diameter portion of the hole 36. When the camshaft 18 is placed in its fully advanced angular position relative to the crankshaft c, that is, when the rotor 30 has been rotated relative to the annular member 22 to move the vane 32 (having the stepped cylindrical hole 36) to the position of FIG. 5, the small-diameter portion 42 is movable into an engaging hole 44 formed in the corresponding portion of the gear 14. The lock pin 40 is biased by a compression coil spring 46 toward the bottom of the engaging hole 44, so that the lock pin 40 is brought into the engaging hole 44 against a biasing force of the compression coil spring 40, when the rotor 30 has been rotated relative to the annular member 22 to the position of FIG. 5, while a hydraulic pressure is not applied to an annular working chamber (indicated by the position from which lead line for the reference numeral 36 extends in FIG. 3) which is defined by the large-diameter portion of the stepped cylindrical hole 36 and the head portion 38 of the lock pin 40. With the lock pin 40 thus fitted in the engaging hole 44, the camshaft 18 is held in its fully advanced angular position relative to the crankshaft c.

A first port 48 and a second port 50 are open to each of the four sectorial chambers 34, which is formed between the adjacent ones of the four radial partition walls 26 of the annular member 22. The first ports 48 are provided to apply a hydraulic pressure to the vanes 32 of the rotor 30 so that the rotor 30 is rotated relative to the annular member 22 in the counterclockwise direction as seen in FIGS. 4 and 5, while the second ports 50 are provided to apply a hydraulic pressure to the vanes 32 so that the rotor 30 is rotated in the clockwise direction as seen in FIGS. 4 and 5. The first ports 48 are held in communication with an annular oil passage 52, while the second ports 50 are held in communication with an annular oil passage 54. The oil passage 52 is also held in communication with the above-indicated annular working chamber (indicated by the lead line for the reference sign 36) partly defined by the stepped cylindrical hold 36. The annular oil passage 52 is communicated with an annular oil passage 60 through an oil passage 56 formed through the end portion of the camshaft 18. The annular oil passage 60 is formed in a bearing portion 58 for the camshaft 18, which is provided in the cylinder head of the internal combustion engine e. On the other hand, the annular oil passage 54 is communicated with an annular oil passage 64 formed in the bearing portion 58, through oil passages 61, 62 formed through the end portion of the camshaft 18. The annular oil passage 60 is connected to a first port 72 of a solenoid-operated hydraulic pressure control valve 70 through a port 66, and an oil passage 68 connected to the port 66, while the annular oil passage 64 is connected to a second port 78 of the hydraulic pressure control valve 70 through a port 74 and an oil passage 76.

The solenoid-operated hydraulic pressure control valve 70 includes a valve housing 90, a solenoid 92, a compression coil spring 94, and a valve spool 96 that is axially movable by the solenoid 92 and the compression coil spring 94 within the valve housing 90. The valve housing 90 has a pressure port 82, a first drain port 86 and a second drain port 88, in addition to the above-indicated ports 72, 78. The pressure port 82 receives a pressurized fluid from a hydraulic pump 80, and the first drain port 86 is provided for selective communication of the first port 72 with an oil reservoir 84, while the second drain port 88 is provided for selective communication of the second port 78 with the oil reservoir 84. The solenoid 92 is controlled to control the position of the valve spool 96 for controlling fluid flows among the various ports indicated above.

The solenoid 92 is controlled according to a control signal generated by an electronic control unit (ECU) 98 incorporating a computer. When the solenoid 92 is in a de-energized state, the valve spool 96 is held at its rightmost position (as seen in FIG. 1) under a biasing action of the compression coil spring 94. In this position, the second port 78 is held in communication with the pressure port 82, while the first port 72 is held in communication with the first drain port 86. When the hydraulic pump 80 is operated while the valve spool 96 is placed in the rightmost position, the pressurized fluid delivered from the hydraulic pump 80 is fed to the sectional chambers 34 through the oil passage 76, port 74, annular oil passage 64, oil passage 62, oil passage 61, annular oil passage 64 and second port 50, so that the vanes 32 of the rotor 30 receive the pressurized pressure in a direction that causes the rotor 30 to be rotated relative to the annular member 22 in the clockwise direction as seen in FIGS. 4 and 5, whereby the closing timing of the intake valve is advanced. When the rotor 30 has been rotated to an angular position of FIG. 5 corresponding to the fully advanced angular position of the camshaft 18, the lock pin 40 is aligned with the engaging hole 44 and is moved in the right direction as seen in FIG. 3, so that the small-diameter portion 42 of the lock pin 40 is brought into engagement with the engaging hole 44 under the biasing action of the compression coil spring 46. Thus, the camshaft 18 is locked in its fully advanced angular position. Immediately after the internal combustion engine e has been started, however, the camshaft 18 is not placed in its fully advanced angular position, since the delivery pressure of the hydraulic pump 80 has not been sufficiently raised.

When the solenoid 92 is energized, on the other hand, the valve spool 96 is moved to its leftmost position as seen in FIG. 3, against the biasing force of the compression coil spring 94. In this position, the first port 72 is held in communication with the pressure port 82 while the second port 78 is held in communication with the second drain port 88. When the hydraulic pump 80 is operated while the valve spool 96 is placed in its leftmost position, the pressurized fluid delivered from the hydraulic pump 80 is fed to the above-indicated annular working chamber of the stepped cylindrical hole 36, as well as the sectorial chambers 34, through the oil passage 68, port 66, annular oil passage 60, oil passage 56, annular oil passage 52 and first ports 48. As a result, the lock pin 40 is moved to the position of FIG. 3 against the biasing force of the compression coil spring 46, with a hydraulic pressure within the annular working chamber in the hole 36, if the small-diameter portion 42 of the lock pin 40 is received in the engaging hole 44. Thus, the small-diameter portion 42 is moved out of the engaging hole 44, and the rotor 30 is rotated relative to the annular member 22 in the counterclockwise direction as seen in FIGS. 4 and 5, with the vanes 32 receiving the hydraulic pressure in that direction, so that the camshaft 18 is rotated relative to the crankshaft c, toward the fully retarded angular position of FIG. 4.

When the solenoid 92 is alternately energized and de-energized with a controlled duty ratio, the valve spool 96 is located at a position between the rightmost and leftmost positions, which position is determined by the duty ratio, so that the rotor 30 is rotated to an angular position at which the hydraulic pressures on the opposite sides of each vane 32 are made equal. As a result, the camshaft 18 is placed in an angular position relative to the crankshaft c, which angular position is between the fully advanced and fully retarded angular positions.

The ECU 98 is adapted to receive various signals including: a signal Sk indicating whether a key switch (not shown) provided on the vehicle has been turned on, and whether the key switch has been rotated to a cranking position for cranking the internal combustion engine e; a signal Da indicative of an amount of operation of an accelerator pedal; a signal Ve indicative of a running speed of the vehicle; a signal Ne indicative of an operating speed of the internal combustion engine e; a signal Te indicative of a temperature of the internal combustion engine e; a signal Ac indicative of the angular position of the crankshaft c; and a signal Av indicative of the angular position of the intake-valve camshaft 18; signals $\omega r$, $\omega s$ indicative of the operating speeds of the motor/generator mg1 and motor/generator mg2. The vehicle control unit 98 performs various control operations according to control programs, on the basis of the input signals as indicated above. The control operations include an operation to control the solenoid 92 in the manner as described above, for controlling the closing timing of the intake valve relative to the reciprocation of the piston of the engine e.

The torque distributing device p of planetary gear type schematically shown in FIG. 3 will be described in detail referring to FIGS. 6A and 6B. The torque distributing device p incorporates a planetary gear mechanism including a planetary carrier to which the crankshaft c of the internal combustion engine e is connected, a ring gear to which the drive shaft of the first motor/generator mg1 is connected, and a sun gear to which the drive shaft of the second motor/generator mg2 is connected. Thus, the internal combustion engine e, the first motor/generator mg1 and the second motor/generator mg2 are connected to each other through the planetary gear mechanism, such that the rotary motions of those drive sources have a predetermined differential relationship determined by the planetary gear mechanism. The torque distributing device p has an operating state in which the first motor/generator mg1 is in the off state (indicated at A in FIG. 6B), and the second motor/generator mg2 is also in the off state (indicated at B in FIG. 6B), while the internal combustion engine e is also in the off state. The torque distributing device p has another operating state in which the first motor/generator mg1 is operated in the forward direction (as indicated at C), and the second motor/generator mg2 is also operated in the forward direction (as indicated at D), while the internal combustion engine is also operated in the forward direction. In this operating state, the internal combustion engine e is placed in one of the following operating conditions: operated to drive the vehicle; operating to apply an engine-brake to the vehicle; operated in a racing condition; and operated by cranking to be started. Each of the first motor/generator mg1 and the second motor/generator mg2 is placed in one of the following operating conditions: operated as an electric motor to generate a vehicle drive force; operated as an electric generator while receiving a drive power; and operated in a racing condition. Whether each of the motor/generator mg1 and the motor/generator mg2 is operated in the forward or reverse direction as the electric motor or the electric generator is determined by an operating state of an electric circuit controlled by the inverter i. In one forward running state of the hybrid vehicle in which the internal combustion engine e is in the off state, the first motor/generator mg1 connected to the axles s is operated as the electric motor in the forward direction (as indicated at C) while the second motor/generator mg2 is operated as the electric motor in the reverse direction (as indicated at E). In a reverse running state of the hybrid vehicle in which the engine is in the off state, the motor/generator mg1 is operated as the electric motor in the reverse direction (as indicated at F) while the motor/generator mg2 is operated as the electric motor in the forward direction (as indicated at G). When the crankshaft c is rotated in the reverse direction to establish the previously described first operating state to increase the compression ratio of the intake air upon starting the vehicle, the second motor/generator mg2 may be operated in the reverse direction (as indicated at H) while the first motor/generator mg1 remains in the off state. There is also an operating state in which the internal combustion engine e is operated in the reverse direction due to a loss of equilibrium between the rotating speeds of the motor/generator mg1 and the motor/generator mg2 (indicated at I and J) while the internal combustion engine e is held in a substantially off state. This operating state will be described with respect to the problem to be solved by the present invention.

In the internal combustion engine e provided with the intake-air compression-ratio control device, the compression ratio of the intake air is maintained at a comparatively low value in a normal operation after the warm-up operation. This aspect will be described with respect to the intake-valve timing control device 10 shown in FIGS. 3–5. In the normal operation after the warm-up operation, the intake-valve timing control device 10 is placed in the state of FIG. 4, or in a state close to the state of FIG. 4, so that the closing timing of the intake valve is fully retarded or almost fully retarded. When the engine is started a relatively short time after the engine is temporarily stopped, the engine is still in a hot state, and the engine can be cranked to be started even if the compression ratio of the intake air is maintained at the comparatively low value, with the closing timing of the intake valve being fully or almost fully retarded. In this condition, the engine can be started with reduced amounts of vibration and noise owing to the comparatively low compression ratio.

When the engine is initially started to drive the vehicle, the engine is in a cold state. The engine is also in a cold state when the engine is started a relatively long time after the engine is temporarily stopped during running of the vehicle. The engine in a cold state can be easily started by cranking after the intake-valve timing control device 10 has been operated to advance the closing timing of the intake valve. Before the engine is started, however, the hydraulic pump 80 used as a hydraulic pressure source is not operated, and the pressurized fluid for controlling the intake-valve timing control device 10 is not available. Accordingly, the closing timing of the intake valve cannot be advanced by the hydraulic pressure before cranking of the engine. In view of this, the crankshaft c of the internal combustion engine e is temporarily rotated in the reverse direction by one or both of the motor/generator mg1 and the motor/generator mg2, to rotate the annular member 22 in the reverse direction relative to the rotor 30 which is held stationary together with the camshaft 18, so that the rotor 30 is placed in the fully advanced angular position of FIG. 5 in which the rotor 30 and the annular member 22 are mechanically locked by the lock pin 40. Thus, the compression ratio of the intake air is increased prior to the cranking of the engine, to facilitate the starting of the engine in a cold state. However, the cranking of the engine at an increased compression ratio of the intake air undesirably causes a larger amount of vibration of the engine than at a comparatively low normal compression ratio.

In the economy-running system vehicle or hybrid vehicle provided with the engine-operating-characteristic changing device capable of increasing or lowering the compression ratio of the intake air, the compression ratio is usually held at the comparatively low normal value or at a further lowered value when the engine is temporarily stopped by the ECU 98 after an operation of the engine in a hot state and at the comparatively low normal value. This change of the compression ratio of the intake air takes place since the compression ratio is controlled in response to the rotating speed of the crankshaft c, irrespective of any one of the previously described various methods (a)–(d), which is used to change the compression ratio. Namely, a suitable control element of the engine-operating-characteristic changing means is controlled so as to follow a change of the rotating speed of the crankshaft c, so that the compression ratio of the intake air is lowered when the hydraulic pressure source for controlling the intake-air compression-ratio control device is not available. In the hybrid drive assembly of FIG. 3 in which the internal combustion engine e is connected to the two motor/generator units mg1, mg2 such that the rotary motions of those drive sources have a predetermined differential relationship, the internal combustion engine e placed in the off state may be operated in the reverse direction due to a loss of equilibrium between the rotating speeds of the motor/generator mg1 and the motor/generator mg2 while the motor/generator mg1 is operated in the forward direction (as indicated at I in FIG. 6) while the motor/generator mg1 is operated in the reverse direction (as indicated at J in FIG. 6). In this event, there is a possibility that the lock pin 40 is brought into engagement with the engaging hole 44, locking the camshaft 18 in the fully advanced angular position in which the compression ratio of the intake air is held at the increased value. If this locking takes place while the engine is operated in a hot state, a relatively large amount of vibration is generated by the engine during its cranking or normal operation in the hot state, due to the unnecessarily increased compression ratio of the intake air, and a driving comfort of the vehicle is deteriorated.

SUMMARY OF THE INVENTION

It is an object of the invention to provide an improved method of controlling an engine-operating-characteristic changing device capable of changing the compression ratio of an intake air of an engine including a locking unit for locking the engine-operating-characteristic changing device in an operating state in which the compression ratio is maintained at an increased value. The method is improved so as to prevent undesirable locking of the engine-operating-characteristic changing device in the above-indicated operating state.

The object described above may be achieved by a method of controlling an engine-operating-characteristic changing device that changes a compression ratio of an intake air of an internal combustion engine of a vehicle. The engine-operating-characteristic changing device is operable between a first operating state that provides a first compression ratio and a second operating state that provides a second compression ratio that is lower than the first compression ratio. The engine-operating-characteristic changing device includes a locking unit for locking the engine-operating-characteristic changing device in the first operating state. The method includes the steps of determining whether there is a possibility that the engine-operating-characteristic changing device is locked in the first operating state by the locking unit when the engine-operating-characteristic changing device is not to be placed in the first operating state, and, when it is determined that there is the possibility, preventing the locking unit from locking the engine-operating-characteristic changing device in the first operating state.

The engine-operating-characteristic changing device makes the first compression ratio higher than the second compression ratio by advancing a closing timing of an intake valve of the internal combustion engine relative to an angular phase of a crankshaft of the internal combustion engine in the first operating state with respect to the closing timing in the second operating state.

The closing timing of the intake valve with respect to the angular phase of the crankshaft is controlled by an intake-valve timing control device provided in a rotation transmitting device that transmits rotary motion of the crankshaft to an intake-valve camshaft of the internal combustion engine. The locking unit acts between a first rotary member of the intake-valve timing control device rotated in synchronization with the crankshaft and a second rotary member of the intake-valve timing control device disposed coaxially with the first rotary member and rotated in synchronization with the intake-valve camshaft. When the closing timing of the intake valve is to be set to a predetermined phase on an advanced side in an adjustable range of the closing timing, the locking unit locks the first and second rotary members in a relative angular position that corresponds to the predetermined phase of the closing timing.

It is determined that there is the possibility of the engine-operating-characteristic changing device being locked by the locking unit in the first operating state when a difference between the angular positions of the first and second rotary members becomes equal to or smaller than a predetermined first threshold value. It is also determined that there is the possibility of the engine-operating-characteristic changing device being locked by the locking unit in the first operating state when a rate of change of the difference between the angular positions of the first and second rotary members becomes equal to or lower than a negative threshold value and the difference between the angular positions of the first and second rotary members is equal to or smaller than a predetermined second threshold value.

The intake-valve timing control device includes a driving unit for rotating the second rotary member relative to the first rotary member to retard the closing timing of the intake valve. The step of preventing the locking unit from locking the engine-operating-characteristic changing device includes operating the driving unit to rotate the second rotary member relative to the first rotary member so as to retard the closing timing of the intake valve.

The internal combustion engine is employed for a hybrid vehicle including a first motor/generator and a second motor/generator to which the internal combustion engine is connected through a differential mechanism and which are rotatable in opposite directions so as to keep the internal combustion engine stopped and so as to operate the internal combustion engine in a reverse direction. The relative angular position of the first and second rotary member is changed in one of an advancing direction to advance the closing timing of the intake valve or a retarding direction to retard the closing timing by controlling the first motor/generator and the second motor/generator to be rotated in the opposite directions. It is determined that there is the possibility of the engine-operating-characteristic changing device being locked in the first operating state, when the internal combustion engine is operated in the reverse direction at an angular velocity not lower than a predetermined threshold with the first operations of the first motor/generator and the second motor/generator in the opposite directions. The step of preventing the locking unit from locking the engine-operating-characteristic changing device includes preventing the internal combustion engine from being operated in the reverse direction by establishing an equilibrium between the rotating speeds of the first motor/generator and the second motor/generator in the opposite directions.

The locking unit includes a lock pin engageable with an engaging hole. The step of preventing the locking unit from locking the engine-operating-characteristic changing device comprises preventing the lock pin from being aligned with the engaging hole.

The method further includes the step of adjusting a frequency at which the locking unit is prevented from locking the engine-operating-characteristic changing device in the first operating state. This adjustment of the frequency of the locking preventive control operation may include one or both of an adjustment of (a) a threshold value used in the determination as to whether there is the above-indicated possibility, and (b) an adjustment of the locking preventive control operation. The method further includes the step of adjusting at least one parameter used for determining the possibility of locking caused by the locking unit and preventing the locking unit from locking the engine-operating-characteristic changing device in the first operating state, when the locking unit is operated at least a predetermined number of times irrespective of implementation of the control for preventing the operation of the locking unit. The predetermined number of times may be the number of operations of the locking unit within a predetermined time period.

According to the aforementioned aspect of the invention, a method of controlling an engine-operating-characteristic changing device changes a compression ratio of an intake air of an internal combustion engine of a vehicle. The engine-operating-characteristic changing device is operable between a first operating state that provides a first compression ratio and a second operating state that provides a second compression ratio that is lower than the first compression ratio, and includes a locking unit for locking the engine-operating-characteristic changing device in the first operating state. The method includes the steps of determining whether there is a possibility that the engine-operating-characteristic changing device is locked in the first operating state by the locking unit when the engine-operating-characteristic changing device is not to be placed in the first operating state, and, when it is determined that there is the possibility, preventing the locking unit from locking the engine-operating-characteristic changing device in the first operating state. The present method is formulated to first determine whether there is a possibility that the engine-operating-characteristic changing device is locked in the first operating state by the locking unit, where the engine-operating-characteristic changing device should not be placed in the first operating state. Thus, the method makes it possible to detect one of serious faulty operations of the locking unit, namely, an operation of the locking unit to lock the engine-operating-characteristic changing means in the first operating state, where the internal combustion engine is in an operating state in which the compression ratio of the intake air should not be made high, in other words, where an increase of the compression ratio is unnecessary and harmful. The method is further formulated to implement a locking preventive control operation to prevent the locking unit from locking the engine-operating-characteristic changing means in the first operating state, if it is determined that there is the above-indicated possibility of locking. Accordingly, the method makes it possible to avoid the undesirable operation of the locking unit, which would cause vibration of the engine, and deterioration of the driving comfort of the vehicle, which is an important factor that determines the quality of the vehicle.

The engine-operating-characteristic changing device makes the first compression ratio higher than the second compression ratio by advancing a closing timing of an intake valve of the internal combustion engine relative to an angular phase of a crankshaft of the internal combustion engine in the first operating state with respect to the closing timing in the second operating state. The closing timing of the intake valve with respect to the angular phase of the crankshaft is controlled by an intake-valve timing control device provided in a rotation transmitting device that transmits rotary motion of the crankshaft to an intake-valve camshaft of the internal combustion engine.

The locking unit acts between a first rotary member of the intake-valve timing control device rotated in synchronization with the crankshaft and a second rotary member of the intake-valve timing control device disposed coaxially with the first rotary member and rotated in synchronization with the intake-valve camshaft. When the closing timing of the intake valve is to be set to a predetermined phase on an advanced side in an adjustable range of the closing timing, the locking unit locks the first and second rotary members in a relative angular position that corresponds to the predetermined phase of the closing timing. In this case, a decrease in the difference between the angular positions of the first and second rotary members represents a change of the angular position of the second rotary member relative to that of the first rotary member in a direction to advance the closing time of the intake valve, namely, a change of the operating state of the intake-valve timing control device from that shown in FIG. 4 toward that shown in FIG. 5. Therefore, it can be determined that there is the possibility of the engine-operating-characteristic changing device being locked by the locking unit in the first operating state when a difference between the angular positions of the first and second rotary members becomes equal to or smaller than a predetermined first threshold value.

As described above, it is determined that there is the possibility of the engine-operating-characteristic changing device being locked by the locking unit in the first operating state when a rate of change of the difference between the angular positions of the first and second rotary members becomes equal to or lower than a negative threshold value and the difference between the angular positions of the first and second rotary members is equal to or smaller than a predetermined second threshold value. In this instance, the possibility of locking of the engine-operating-characteristic changing device in the first operating state is detected on the basis of a time derivative of the difference between the angular positions of the first and second rotary members, that is, the rate at which the difference is reduced toward the state of locking of the changing means in the first operating state.

The intake-valve timing control device may include drive unit in the form of a hydraulically operated rotary actuator operable to rotate the second member in the form of the rotor 30, relative to the second member in the form of a housing constituted by the gear 14, annular member 22 and end plate 24, as shown in FIGS. 3–5. In this case, the locking preventive control operation may be implemented by this drive unit, that is, by operating the drive means to rotate the second rotary member relative to the first rotary member so as to retard the closing timing of the intake valve.

As described above, the internal combustion engine may be used for a hybrid vehicle including a drive mechanism with the internal combustion engine and a first motor/generator and a second motor/generator to which the engine is connected through a differential mechanism and which are operable in opposite directions so as to keep the engine stopped and so as to operate the engine in a reverse direction. In this hybrid vehicle, the first motor/generator and the second motor/generator may be arranged to be operated in the opposite directions, to change the relative angular position of the first and second rotary members in an advancing direction to advance the closing timing of the intake valve or in a retarding direction to retard the closing timing. In this arrangement, an operation of the internal combustion engine in the reverse direction due to the operations of the first motor/generator and the second motor/generator in the opposite directions will eventually cause the second rotary member to be placed in the fully advanced angular position relative to the first rotary member, so that there arises a possibility that the engine-operating-characteristic changing means is locked in the first operating state. If the internal combustion engine is operated in the reverse direction at an angular velocity not lower than a predetermined threshold during the operations of the first motor/generator and the second motor/generator in the opposite directions, it is possible to prevent the engine-operating-characteristic changing means from being locked in the first operating state, by preventing the internal combustion engine from being operated in the reverse direction, by establishing an equilibrium between the rotating speeds of the first motor/generator and the second motor/generator in the opposite directions.

Irrespective of the manner of determination as to whether there is the above-indicated possibility of locking of the engine-operating-characteristic changing means and the manner of the locking preventive control operation, the frequency at which the locking preventive control operation is implemented can be automatically adjusted to the desired value, so as to optimize the locking preventive control to prevent the locking of the engine-operating-characteristic changing means according to the invention, where the threshold value to be used to determine the presence or absence of the above-indicated possibility of locking is adjusted on the basis of the frequency of the locking preventive control operation. The locking preventive control can be further optimized, where the degree of the locking preventive control operation is increased when the locking unit has been operated for more than a predetermined number of times or at a frequency higher than a threshold value, even after the locking preventive control operation.

BRIEF DESCRIPTION OF THE DRAWINGS

The invention will be described in conjunction with exemplary embodiments shown in the following drawings, in which like numerals represent similar elements, and wherein:

FIG. 11 is a flowchart illustrating one example of a locking preventive control operation performed in step S200 of the flowchart of FIG. 7;

FIG. 12 is a flowchart illustrating another example of the locking preventive control operation performed in the step S200; and FIG. 13 is a flowchart illustrating a modification of the basic operation of the locking preventive control of the engine-operating-characteristic changing device illustrated in the flowchart of FIG. 7, which modification is made according to a second embodiment of this invention and includes an automatic adjustment of the frequency at which the locking preventive control is implemented.

DETAILED DESCRIPTION OF PREFERRED EMBODIMENTS

Figure 1:
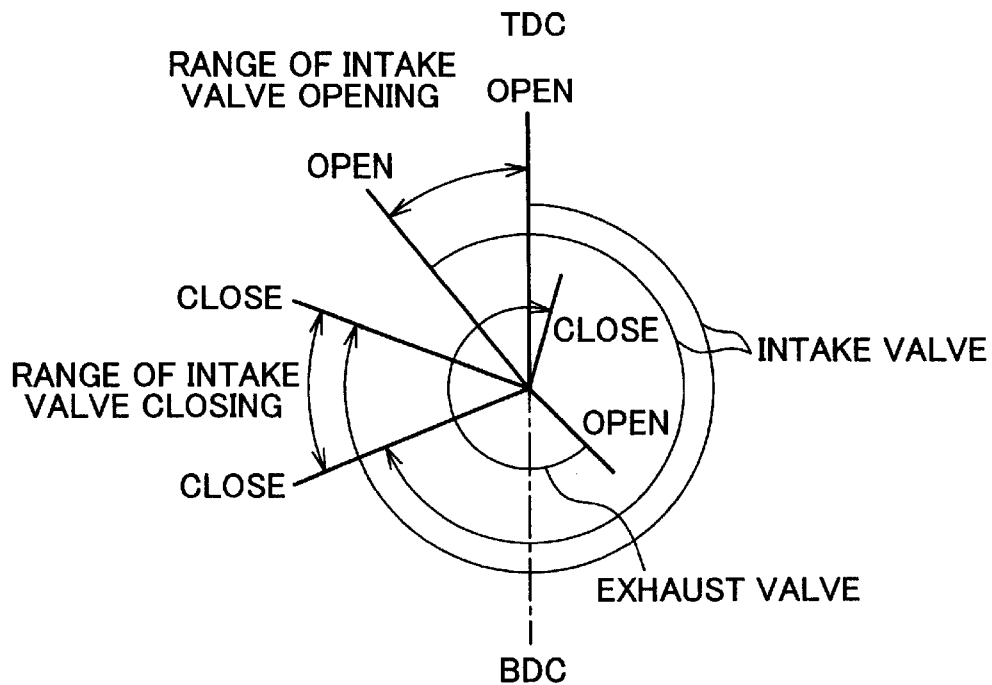
FIG. 1 is a diagram showing ranges of adjustment of opening and closing timings of an intake valve to change a compression ratio of an intake air, together with opening and closing times of an exhaust valve.
Figure 2:
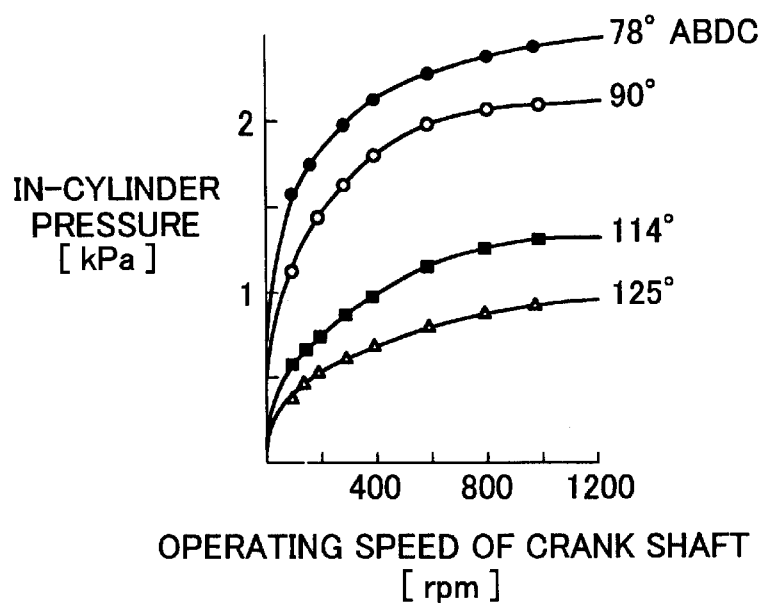
FIG. 2 is a graph illustrating changes of a cylinder pressure with a change in cranking speed, which correspond to respective different angles of the closing timing of the intake valve after the bottom dead center (ABDC)
Figure 3:
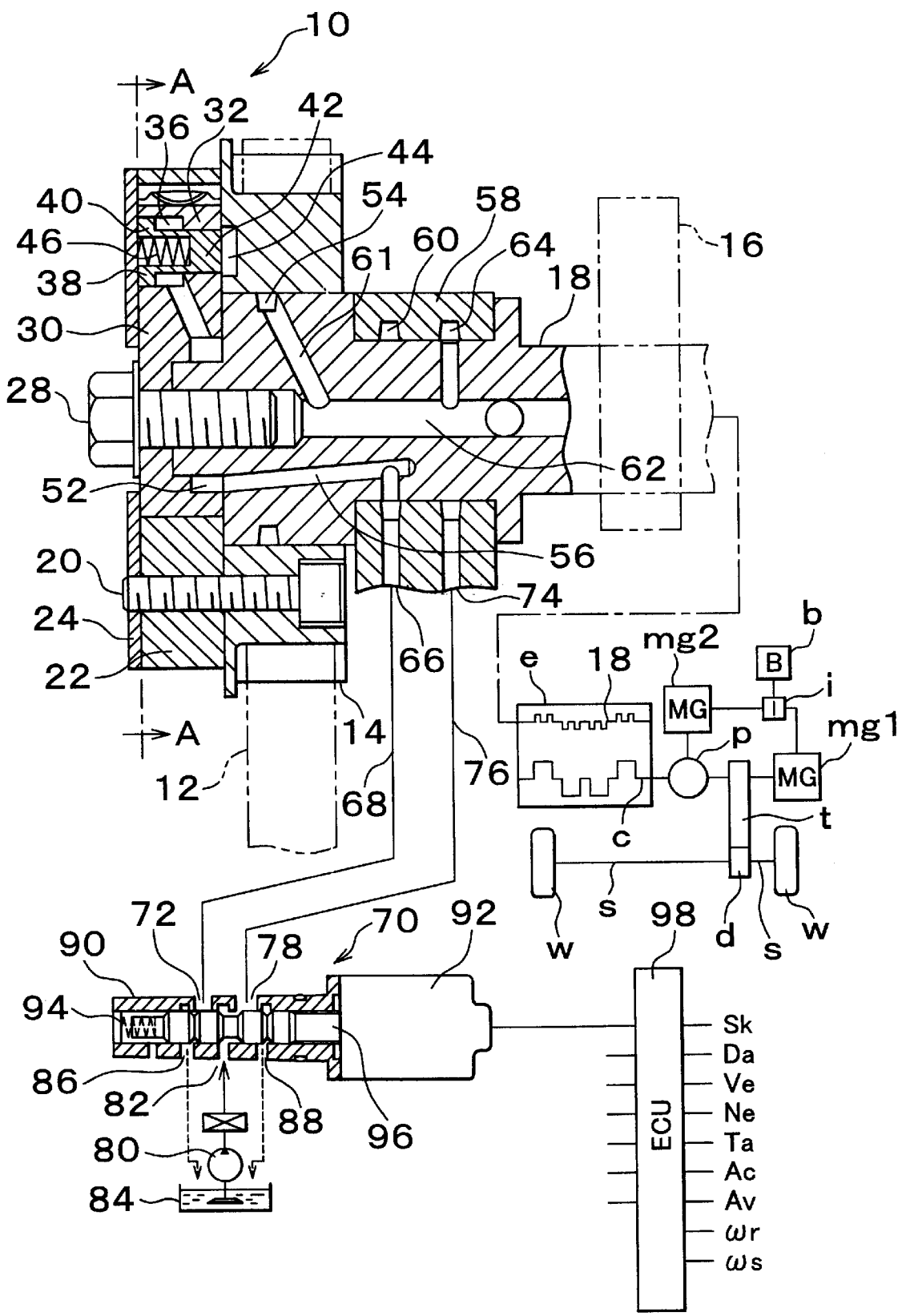
FIG. 3 is a schematic view showing an example of a basic arrangement of an intake-valve timing control device.
Figure 4:
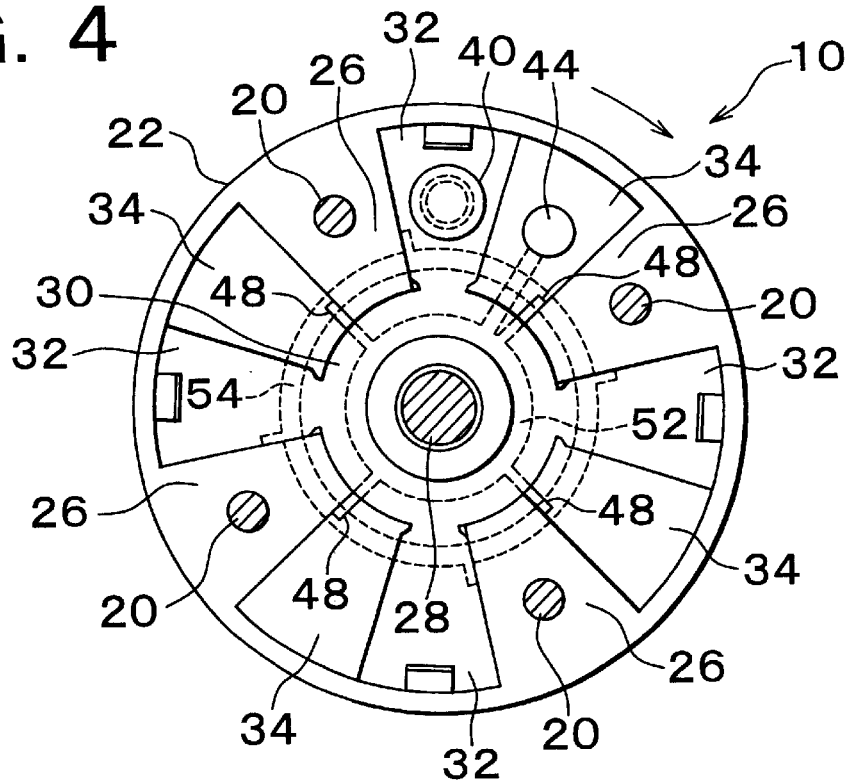
FIG. 4 is a view taken along line A—A of FIG. 3, showing the intake-valve timing control device placed in its fully retarded state of the closing timing of the intake valve.
Figure 5:
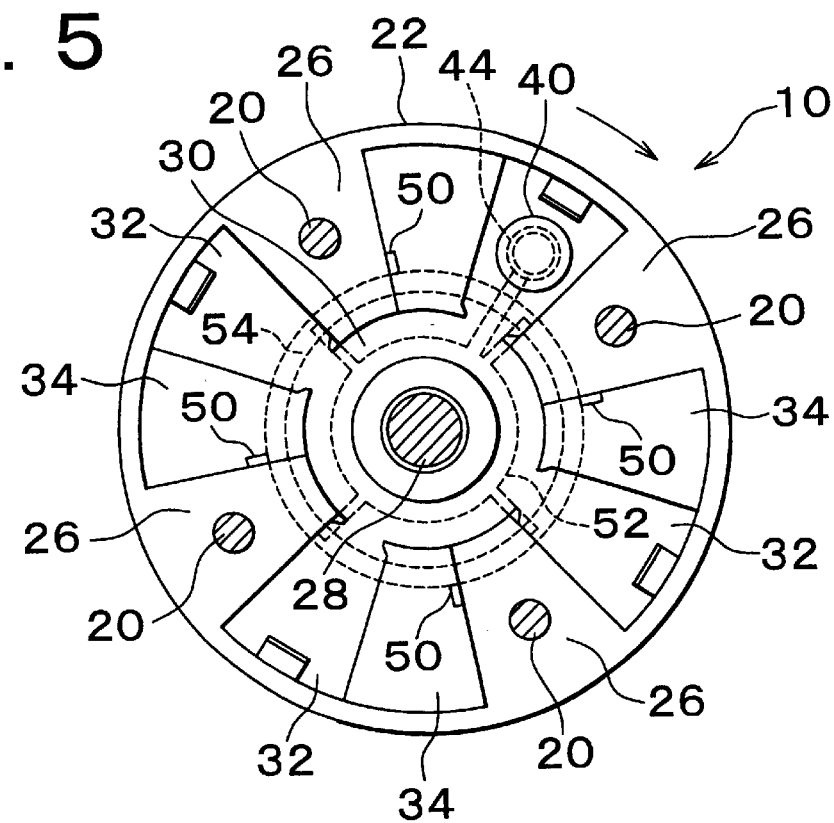
FIG. 5 is a view taken along line A—A of FIG. 3, showing the intake-valve timing control device placed in its fully advanced state of the closing timing of the intake valve.
Figure 7:
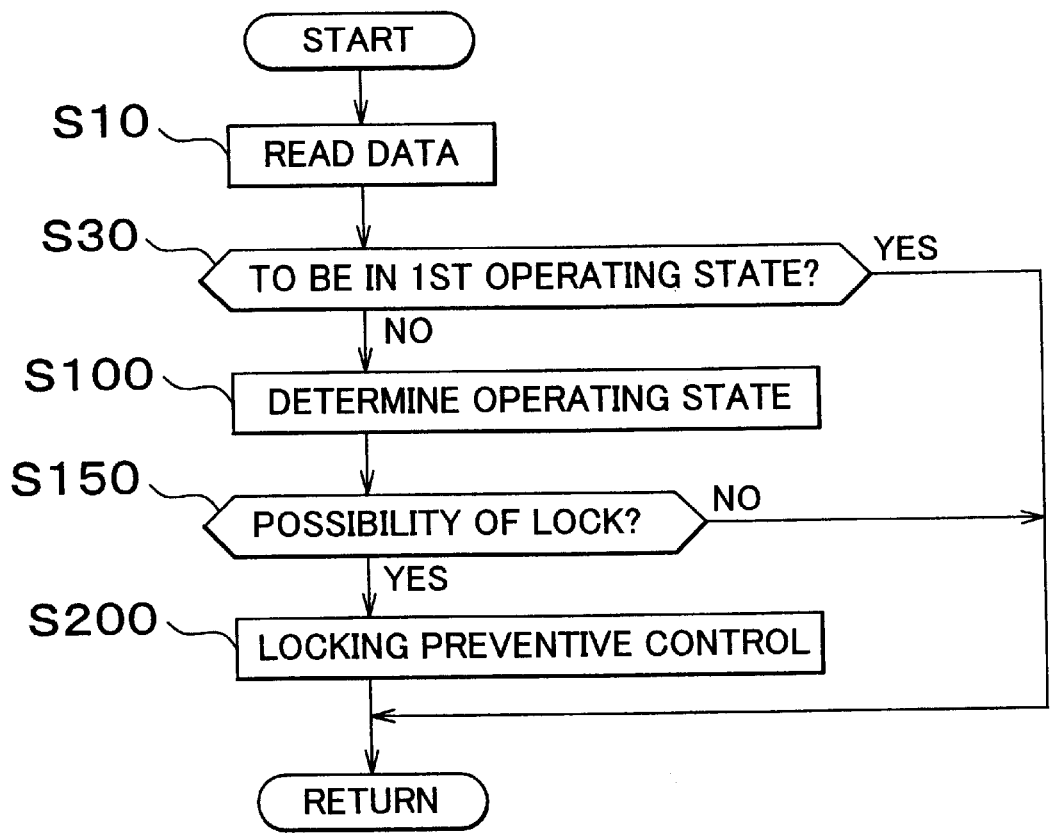
FIG. 7 is a flowchart illustrating a basic operation to implement a locking preventive control of engine-operating-characteristic changing device, according to one embodiment of the invention.

Referring first to the flowchart of FIG. 7, there is illustrated a basic operation to control an operation of an engine-operating-characteristic changing device in the form of the intake-valve timing control device 10 shown in FIGS. 3–5, which is arranged to change the compression ratio of an intake air of an internal combustion engine e. This control operation of the engine-operating-characteristic changing device according to the flowchart of FIG. 7 is initiated when the signal Sk indicative of an operating state of the key switch is generated by the ECU 98 shown in FIG. 3.

Referring to FIG. 7, the control operation is initiated in step S10 where various kinds of data used for the control operation are read. These kinds of data include the signal Sk indicative of the operating state of the key switch, the signal Da indicative of an amount of operation of the accelerator pedal, the signal Ve indicative of the vehicle running speed; the signal Ne indicative of the operating speed of the internal combustion engine e, the signal Te indicative of the temperature of the internal combustion engine e, the signal Ac indicative of the angular position of the crankshaft c, the signal Av indicative of the angular position of the intake-valve camshaft 18, and the signals $\omega r$, $\omega s$ indicative of the operating speeds of the motor/generator mg1 and motor/generator mg2. The control flow then goes to step S30 in which the operating state of the engine is determined on the basis of the signals Da, Ve, Ne and Tc, and it is determined whether the engine-operating-characteristic changing device should be placed in a first operating state in which the compression ratio of the intake air is maintained at a comparatively high value. If YES is obtained in step S30, that is, it is not necessary to control the engine-operating-characteristic changing device, the control flow goes back to step S10, and steps S10 and S30 are repeatedly implemented, while the above-indicated kinds of data are updated.

Figure 8:
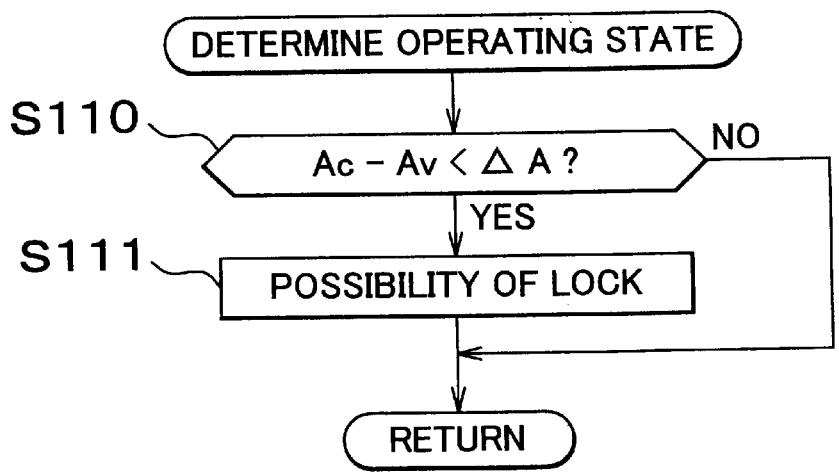
FIG. 8 is a flowchart illustrating one example of an operation to check an operating state of the engine-operating-characteristic changing means, which is performed in step S100 in the flowchart of FIG. 7.
Figure 9:
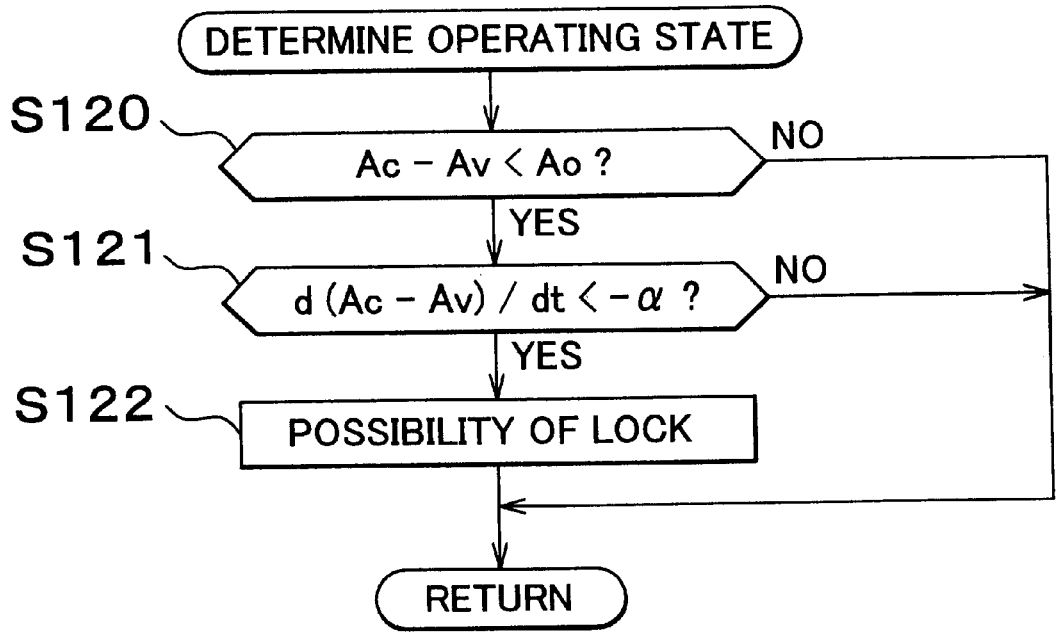
FIG. 9 is a flowchart illustrating another example of the operation to check the operating state of the engine-operating-characteristic changing device, which is performed in step S100.
Figure 10:
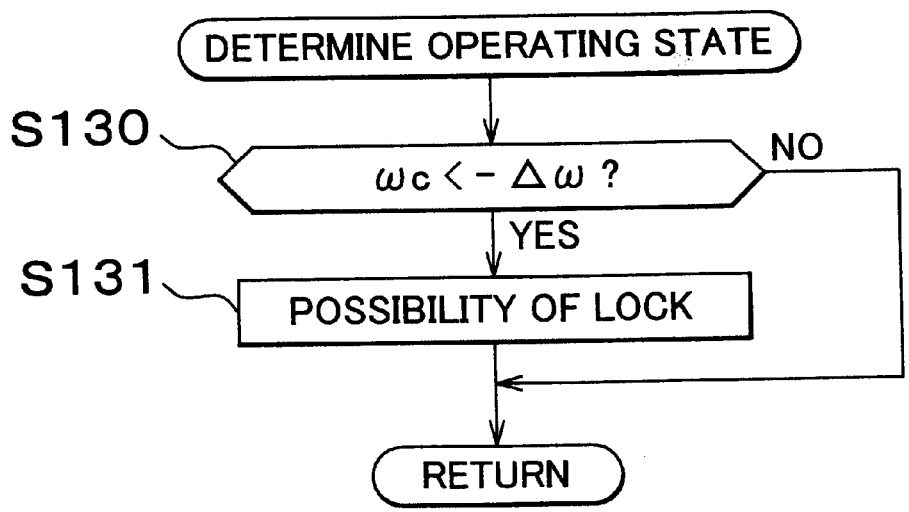
FIG. 10 is a flowchart illustrating a further example of an operation to check the operating state of the engine-operating-characteristic changing device, which is performed in step S100.

If NO is obtained in step S30, the control flow goes to step S100 in which the operating state of the engine-operating-characteristic changing device is determined. That is, the angular position of the intake-valve camshaft 18 (the fully retarded position of FIG. 4, the fully advanced position of FIG. 5, or any angular position between the fully retarded and advanced positions), and the direction in which the angular position is changed are determined. The operation in step S100 is illustrated in the flowcharts of FIGS. 8–10. Step S100 is followed by step S150 in which it is determined whether there is a possibility that the engine-operating-characteristic changing device is unnecessarily or undesirably locked in the first operating state, that is, in the fully advanced angular position shown in FIG. 5. This determination in step S150 is made on the basis of the determinations in step S100. If NO is obtained in step S150, steps S10, S30, S100 and S150 are repeatedly implemented while the above-indicated kinds of data are updated. If YES is obtained in step S150, the control flow goes to step S200 in which a preventive operation is implemented to prevent the engine-operating-characteristic changing device from being locked in the fully advanced position shown in FIG. 5.

The flowchart of FIG. 8 illustrates one example of the operation to be performed in step S100 in which the operating state of the engine-operating-characteristic changing device is determined. In this example, it is assumed that the engine-operating-characteristic changing device is the intake-valve timing control device 10 shown in FIGS. 3–5. In step S110, it is determined whether a difference (Ac–Av) between the angular positions of the crankshaft c and the intake-valve camshaft 18 of the internal combustion engine e is smaller than a predetermined threshold value $\Delta A$, which is relatively small. The determination in step S110 is made on the basis of the signals Ac and Av. If NO is obtained in step S110, i.e., it is determined that there is not the above-indicated possibility of locking, the control flow goes back to step S10. If YES is obtained in step S110, the control flow goes to step S111 in which it is determined that there is the above-indicated possibility of locking.

The flowchart of FIG. 9 illustrates another example of the operation to be performed in step S100 in which the operating state of the engine-operating-characteristic changing device is determined. In this example, it is also assumed that the engine-operating-characteristic changing device is the intake-valve timing control device 10 shown in FIGS. 3–5. In step S120, it is determined whether a difference (Ac–Av) between the angular positions of the crankshaft c and the intake-valve camshaft 18 of the internal combustion engine e has become smaller than a predetermined threshold value Ao, which is relatively large and at which the locking of the intake-valve timing control device 10 in the fully advanced position is less likely to take place. The determination in step S120 is also made on the basis of the signals Ac and Av. If NO is obtained in step S120, i.e., it is determined that there is no possibility of locking, the control flow goes back to step S10. If YES is obtained in step S120, the control flow goes to step S121 in which it is determined whether the rate of change d(Ac–Av)/dt of the above-indicated difference of the angular positions is smaller than a predetermined negative threshold value $-\alpha$, or that is, whether the absolute value $|d(Ac-Av)/dt|$ of the rate of change is larger than the absolute value $|-\alpha|$ of the threshold value $-\alpha$. If YES is obtained in both steps S120 and S121, that is, the above-indicated difference of the angular positions is smaller than the threshold value Ao and this difference is decreasing at a rate higher than the predetermined value $\alpha$, it is determined that there is the above-indicated possibility of locking. In this case, the control flow goes to step S122 in which it is determined that there is the above-indicated possibility of locking.

Figure 6A:
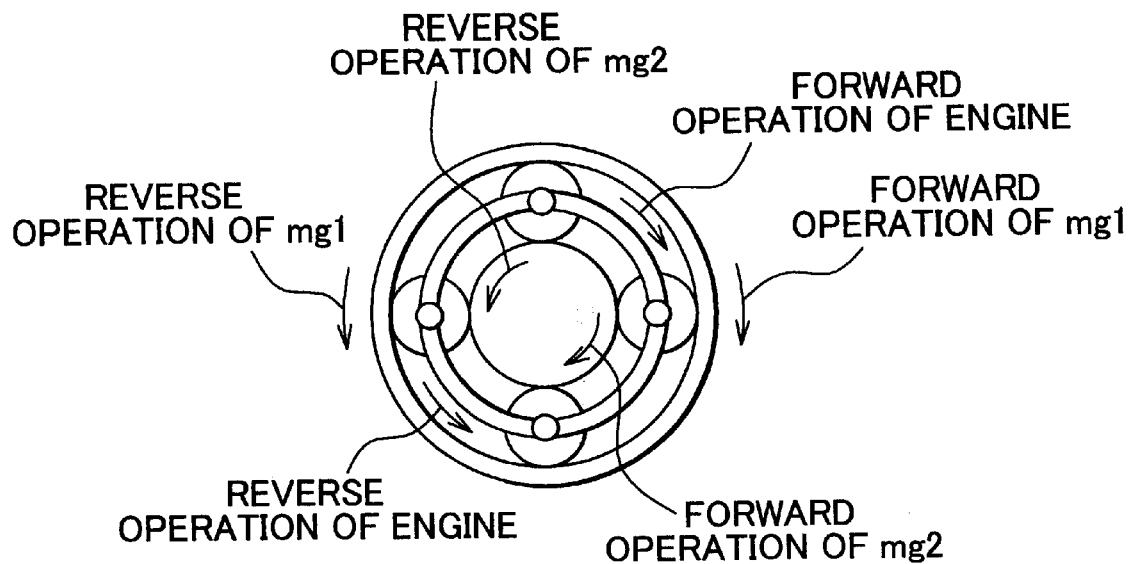
FIG. 6A is a schematic view showing details of a torque distributing device p of planetary gear type shown in FIG. 3.

The flowchart of FIG. 10 illustrates a further example of the operation to be performed in step S100 in which the operating state of the engine-operating-characteristic changing device is determined. In this example, the engine-operating-characteristic changing device is also the intake-valve timing control device 10 shown in FIGS. 3–5. It is assumed that the internal combustion engine is operatively connected to the first motor/generator mg1 and the second motor/generator mg2 through the torque distributing device p (differential device) of planetary gear type, as shown in FIGS. 3 and 6A. In step S130, it is determined whether the operating speed $\omega c$ of the crankshaft c of the internal combustion engine e is lower than a predetermined negative threshold value $-\Delta\omega$ the absolute value of which is relatively small. That is, in step S130, it is determined whether the crankshaft c is operated in the reverse direction at a speed higher than a predetermined threshold value $\Delta\omega$.

Figure 6B:
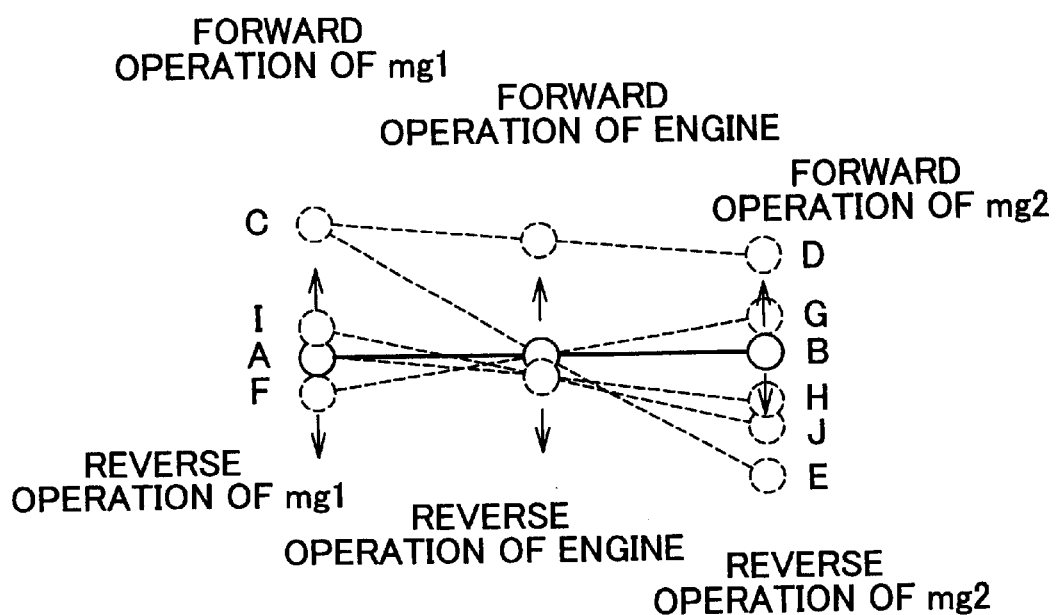
FIG. 6B is a view showing an operational equilibrium between an internal combustion engine and a first and a second motor/generator.

In the planetary gear mechanism shown in FIG. 6A, an equation $\omega c=(\omega r+f\omega s)/(1+f)$ is satisfied, wherein the rotating speeds of the sun gear, ring gear and carrier are represented by $\omega s$, $\omega r$ and $\omega c$, respectively, and the ratio of the number of teeth of the sun gear to that of the ring gear is represented by f (smaller than 1). While the crankshaft c is almost at rest during a temporary stop of the internal combustion engine, it is difficult to detect a small angle of rotation of the crankshaft in the reverse direction on the basis of the signal Ac indicative of the angular position of the crankshaft. When the temporary stop of the engine is caused by the rotations of the two motor/generator units in the drive mechanism of FIGS. 3 and 6B, the rotating speeds $\omega r$ and $\omega s$ corresponding to the rotating speeds of the motor/generator units mg1 and mg2 are relatively high, and the crankshaft is rotated in the reverse direction due to a loss of equilibrium between the rotating speeds ωr and ωs of the motor/generator units mg1, mg2. Accordingly, by monitoring the rotating speeds ωr and ωs, it is possible to detect that the rotating speed ωc is lower than the predetermined negative threshold value −Δω, that is, to detect that the speed ωc of rotation in the reverse direction is higher than the absolute value |−Δω|. If the crankshaft is rotated in the reverse direction at a speed higher than the absolute value |−Δω|, the intake-valve timing control device 10 is eventually locked in the fully advanced angular position shown in FIG. 5. Therefore, if YES is obtained in step S130, the control flow goes to step S131 in which it is determined that there is the possibility of locking.

The flowchart of FIG. 11 illustrates one example of a locking preventive control operation to be performed in step S200 of the flowchart shown in FIG. 7. In this example, the engine-operating-characteristic changing device is the intake-valve timing control device 10 shown in FIGS. 3–5, and the locking preventive control is effected by increasing the duty ratio of the solenoid 92 of the hydraulic pressure control valve 70. According to a conventional control of the intake-valve timing control device 10 of FIGS. 3–5 described above as related art the crankshaft of the engine is rotated in the reverse direction to place the intake-valve camshaft 18 in the fully advanced angular position of FIG. 5, upon starting of the engine in a cold state, since the pressurized fluid is not available when the engine is started. However, the problem solved by the present invention takes place when the pressurized fluid is available, that is, primarily takes place when the engine is temporarily stopped. As described above, the problem occurs when the engine-operating-characteristic changing device is locked by the locking device in the first operating state in which the compression ratio of the intake air is maintained at a comparatively high value, where the changing device should not be placed in the placed in this first operating state. Since the pressurized fluid is available, an increase of the duty ratio of the solenoid 92 causes the valve spool 96 to be moved in the left direction as seen in FIG. 3, permitting the pressurized fluid delivered from the hydraulic pump 80 to be fed into the sectorial chambers 34 through the port 72, oil passages 68, 56, 52 and the port 48, so that the rotor 30 is rotated relative to the housing (constituted by the gear 14, annular member 22 and end plate 24) of the control device 10, from the fully advanced angular position shown in FIG. 5 toward the fully retarded angular position shown in FIG. 4, preventing the locking of the control device 10 in the first operating state, that is, in the fully advanced position.

The flowchart of FIG. 12 illustrates another example of the locking preventive control operation to be performed in step S200 of the flowchart shown in FIG. 7. In this example, the engine-operating-characteristic changing device is also the intake-valve timing control device 10 shown in FIGS. 3–5 and the internal combustion engine is operatively connected to the first and second motor/generator units through the torque distributing device p (differential device) of planetary gear type, as shown in FIGS. 3 and 6A. The locking preventive control is effected by controlling the operating speed of the first motor/generator mg1 and/or the operating speed of the second motor/generator mg2. Described in detail, the locking preventive control is initiated in step S220 in which it is determined whether the vehicle is running in the forward direction. In the drive mechanism of FIGS. 3 and 6B, the axles s are connected to the first motor/generator mg1 through the differential gear d and the transmission t, the first motor/generator mg1 is operated in the forward direction (as indicated at C in FIG. 6B) while the second motor/generator mg2 is operated in the reverse direction (as indicated at E), if the vehicle is running in the forward direction with the engine e held in a temporary stop. If YES is obtained in step S220, the control flow goes to step S221. If NO is obtained in step S220, the control flow goes to step S222.

In step S221, during the forward running of the vehicle, the forward operating speed of the motor/generator mg1 is increased and/or the reverse operating speed of the motor/generator mg2 is reduced for preventing the locking of the intake-valve timing control device 10 in the fully advanced position shown in FIG. 5. On the other hand, in step S222, during the reverse running of the vehicle, the reverse operating speed of the motor/generator mg1 is reduced and/or the forward operating speed of the motor/generator mg2 is increased for preventing the locking of the intake-valve timing control device 10 in the fully advanced position shown in FIG. 5. In this case, the locking preventive control operation is effected not only when the vehicle is running in the reverse direction, but also when the vehicle is stopped.

Referring to the flowchart of FIG. 13, there will be described a second embodiment of this invention, which is a modification of the first embodiment illustrated in the flowchart of FIG. 7. In the modified embodiment, the frequency at which the locking preventive control operation in step S200 is implemented is automatically adjusted to a desired value. That is, the modified embodiment is arranged such that the frequency or sensitivity of the locking preventive control operation is automatically adjusted to the desired value, at a predetermined time interval, so that the locking preventive control operation is implemented at the desired frequency, for preventing the engine-operating-characteristic changing device from being locked in the first operating state for increasing the compression ratio of the intake air, where the changing device should not be placed in the first operating state. The locking preventive control according to the embodiment is initiated in step S10 in which various kinds of data are read. Step S10 is followed by step S11 in which it is determined whether a flag F1 is set at "b 1". Since the flag F1 is reset to "0" upon initiation of the locking preventive control and in step S18 (which will be described later), NO is obtained when step S11 is implemented for the first time or immediately after step S18 is implemented. In this case, the control flow goes to step S12 in which a timer provided in the computer of the vehicle control unit 98 is set, and count of a time lapse is started. After the timer is set, the flag F1 is set to "1" in step S13. Thereafter, steps S12 and S13 are skipped until the flag F1 is reset to "0" in step S18.

Step S13 is followed by step S14 in which it is determined whether the timer has timed out. Initially, NO is obtained in step S14, and the control flow goes to steps S30–S200 to implement the locking preventive control operation as needed, as described above by reference to FIG. 7. If the locking preventive control operation is implanted in step S200, the control flow then goes to step S201 in which it is determined whether a flag F2 is set at "1". Since this flag F2 is also initially reset at "1", NO is initially obtained in step S201, and the control flow goes to step S202 in which a count N1 of counter is incremented by "1". This counter is provided in the computer of the ECU 98. The control flow goes to step S203 in which the flag F2 is set to "1". After the locking preventive control operation has been implemented in step S200, NO is obtained in step S150, and the control flow goes to step S208 in which the flag F2 is reset to "0". If the locking preventive control operation is again implemented, the count N1 is again incremented. Thus, the count N1 indicates the number of the locking preventive control operations performed in step S200.

In the present embodiment, step S204 is implemented after an operation of incrementing the count N1 in step S202, in which it is determined whether the locking device has been activated to lock the intake-valve timing control device 10 in the fully advanced angular position, even after the locking preventive control operation was carried out in step S200. If YES is obtained in step S204, steps S205–S207 are implemented to count the number of the operations of the locking device, as a count N2 of a counter which is provided in the computer of the vehicle control unit 98, like the counter for the count N1. A flag F3 used for the count N2 is also reset to "0" in step S208.

When the above-indicated timer has timed out, YES is obtained in step S14, and the control flow goes to step S15 in which the count N1 is compared with a predetermined target value Na, obtain a difference ($\Delta N=N1-Na$) between the count N1 and the target value Na, and, on the basis of the obtained difference, adjust the threshold value to be used in step S150 to make the determination as to whether there is the above-indicated possibility of locking, and/or the degree of the locking preventive control operation to be performed in step S200. The aforementioned adjustment is made such that the count N1 approaches the desired value Na, that is, the difference $\Delta N$ becomes zero.

Step S15 is followed by step S16 in which it is determined whether the count N2 obtained in step S206 is equal to or larger than a predetermined threshold value Nb. The count N2 indicates the number of the operations of the locking unit performed irrespective of the locking preventive control operation. If YES is obtained in step S16, the control flow goes to step S17 in which the locking preventive control operation is further enhanced. More particularly, in step S17, the process of step S15 is repeatedly implemented. The count N2 indicates the number of the operations of the locking device performed within a predetermined period of time in the embodiment shown in FIG. 13. However the N2 may indicate the total number of the operations of the locking unit, which will be updated when the count N2 becomes larger than the Nb.

According to the second embodiment of this invention described above, the frequency of the locking preventive control operation is adjusted to the desired value, or the sensitivity of the locking preventive control operation is automatically adjusted to the desired value, irrespective of the specific manner of determination in step S150 as to whether there is the above-indicated possibility of locking, which is illustrated in FIGS. 9–10 by way of example, and the specific matter of the locking preventive control operation in step 200, which is illustrated in FIGS. 10 and 11 by way of example.

In the illustrated embodiment, the controller (ECU 98) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A method of controlling an engine-operating-characteristic changing device that changes a compression ratio of an intake air of an internal combustion engine of a vehicle, the engine-operating-characteristic changing device being operable between a first operating state that provides a first compression ratio and a second operating state that provides a second compression ratio that is lower than the first compression ratio, the engine-operating-characteristic changing device including a locking unit for locking the engine-operating-characteristic changing device in the first operating state; the method comprising the steps of:

determining whether there is a possibility that the engine-operating-characteristic changing device is locked in the first operating state by the locking unit when the engine-operating-characteristic changing device is not to be placed in the first operating state; and when it is determined that there is the possibility, preventing the locking unit from locking the engine-operating-characteristic changing device in the first operating state.

2. The method according to claim 1, wherein the engine-operating-characteristic changing device makes the first compression ratio higher than the second compression ratio by advancing a closing timing of an intake valve of the internal combustion engine relative to an angular phase of a crankshaft of the internal combustion engine in the first operating state with respect to the closing timing in the second operating state.

3. The method according to claim 2, wherein:

the closing timing of the intake valve with respect to the angular phase of the crankshaft is controlled by an intake-valve timing control device provided in a rotation transmitting device that transmits rotary motion of the crankshaft to an intake-valve camshaft of the internal combustion engine;

the locking unit acts between a first rotary member of the intake-valve timing control device rotated in synchronization with the crankshaft and a second rotary member of the intake-valve timing control device disposed coaxially with the first rotary member and rotated in synchronization with the intake-valve camshaft; and when the closing timing of the intake valve is to be set to a predetermined phase on an advanced side in an adjustable range of the closing timing, the locking unit locks the first and second rotary members in a relative angular position that corresponds to the predetermined phase of the closing timing.

4. The method according to claim 3, wherein the determining step includes determining that there is the possibility of the engine-operating-characteristic changing device being locked by the locking unit in the first operating state when a difference between the angular positions of the first and second rotary members becomes equal to or smaller than a predetermined first threshold value.

5. The method according to claim 3, wherein the determining step includes determining that there is the possibility of the engine-operating-characteristic changing device being locked by the locking unit in the first operating state when a rate of change of the difference between the angular positions of the first and second rotary members becomes equal to or lower than a negative threshold value and the difference between the angular positions of the first and second rotary members is equal to or smaller than a predetermined second threshold value.

6. The method according to claim 3, wherein:
the intake-valve timing control device includes a driving unit that rotates the second rotary member relative to the first rotary member to retard the closing timing of the intake valve; and
the step of preventing the locking unit from locking the engine-operating-characteristic changing device comprises operating the driving unit to rotate the second rotary member relative to the first rotary member so as to retard the closing timing of the intake valve.

7. The method according to claim 3, wherein:
the internal combustion engine is provided in a hybrid vehicle including a first motor/generator and a second motor/generator to which the internal combustion engine is connected through a differential mechanism and which are rotatable in opposite directions so as to keep the internal combustion engine stopped and so as to operate the internal combustion engine in a reverse direction; and
the relative angular position of the first and second rotary members is changed in one of an advancing direction to advance the closing timing of the intake valve or a retarding direction to retard the closing timing by controlling the first motor/generator and the second motor/generator to be rotated in the opposite directions.

8. The method according to claim 7, wherein the determining step includes determining that there is the possibility of the engine-operating-characteristic changing device being locked in the first operating state, when the internal combustion engine is operated in the reverse direction at an angular velocity not lower than a predetermined threshold with the first operations of the first motor/generator and the second motor/generator in the opposite directions.

9. The method according to claim 7, wherein the step of preventing the locking unit from locking the engine-operating-characteristic changing device comprises preventing the internal combustion engine from being operated in the reverse direction by establishing an equilibrium between the rotating speeds of the first motor/generator and the second motor/generator in the opposite directions.

10. The method according to claim 8, wherein the step of preventing the locking unit from locking the engine-operating-characteristic changing device comprises preventing the internal combustion engine from being operated in the reverse direction by establishing an equilibrium between the rotating speeds of the first motor/generator and the second motor/generator in the opposite directions.

11. The method according to claim 1, wherein:
the locking unit includes a lock pin engageable with an engaging hole; and
the step of preventing the locking unit from locking the engine-operating-characteristic changing device comprises preventing the lock pin from being aligned with the engaging hole.

12. The method according to claim 1, further comprising adjusting a frequency at which the locking unit is prevented from locking the engine-operating-characteristic changing device in the first operating state.

13. The method according to claim 1, further comprising adjusting at least one parameter used for determining the possibility of locking caused by the locking unit and preventing the locking unit from locking the engine-operating-characteristic changing device in the first operating state, when the locking unit is operated at least a predetermined number of times irrespective of implementation of the control for preventing the operation of the locking unit.

14. A control system that controls an engine-operating-characteristic changing device that changes a compression ratio of an intake air of an internal combustion engine of a vehicle, the engine-operating-characteristic changing device being operable between a first operating state that provides a first compression ratio and a second operating state that provides a second compression ratio that is lower than the first compression ratio, the engine-operating-characteristic changing device including a locking unit for locking the engine-operating-characteristic changing device in the first operating state, the control system comprising a controller that:
determines whether there is a possibility that the engine-operating-characteristic changing device is locked in the first operating state by the locking unit when the engine-operating-characteristic changing device is not to be placed in the first operating state; and
when it is determined that there is the possibility, prevents the locking unit from locking the engine-operating-characteristic changing device in the first operating state.

* * * * *